Figure 2:
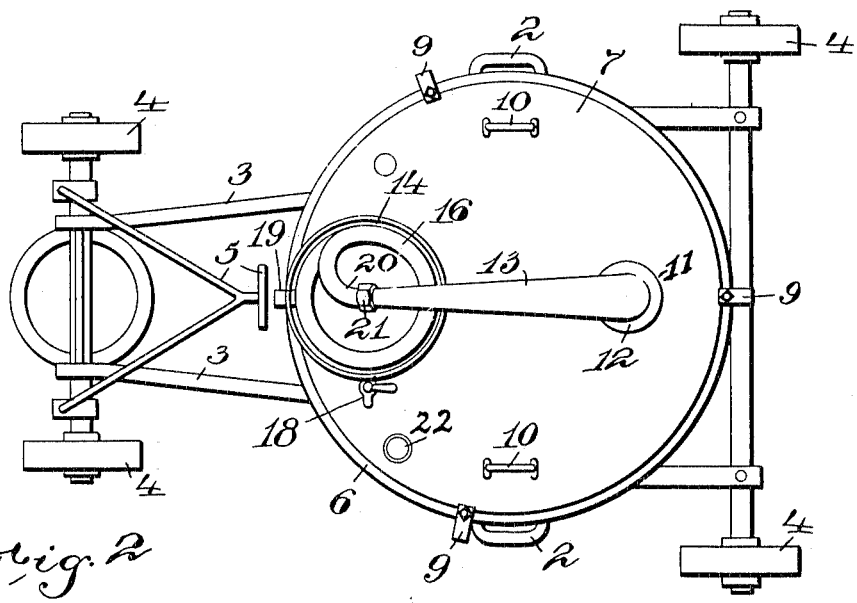

L. HAMBROCK, Jr.
VARNISH KETTLE.
APPLICATION FILED NOV. 21, 1913.

1,106,142.

Patented Aug. 4, 1914.

WITNESSES:
M. A. Johnson.
H. Trautvetter.

INVENTOR
Louis Hambrock, Jr.
BY
Dyke & Canfield
ATTORNEYS.

UNITED STATES PATENT OFFICE.

LOUIS HAMBROCK, JR., OF NEWARK, NEW JERSEY, ASSIGNOR TO FLOOD & CONKLIN CO., OF NEWARK, NEW JERSEY, A CORPORATION OF NEW JERSEY.

VARNISH-KETTLE.

1,106,142.  Specification of Letters Patent.  Patented Aug. 4, 1914.

Application filed November 21, 1913. Serial No. 802,254.

*To all whom it may concern:*

Be it known that I, LOUIS HAMBROCK, Jr., a citizen of the United States, and a resident of Newark, county of Essex, and State of New Jersey, have invented certain new and useful Improvements in Varnish-Kettles, of which the following is a specification.

My invention relates to an apparatus for making varnish, and more particularly to an apparatus intended for the heat treatment of resins in the manufacture of varnish, although its use is not confined thereto, and apparatus constructed in accordance with my invention may be made use of for any purpose for which it is available and for treating various kinds of materials.

It has been common heretofore to subject the resins used in the making of varnish to heat treatment, cooking, or what is ordinarily somewhat inaccurately described as "distillation," in portable kettles placed on wheels, and provided with a vented cover, which kettles are charged with the material to be treated, and then moved over a stationary fire, the vent in the cover making communication with the chimney or with a hood connected with the chimney, to carry off gases which escape from the vent in the cover.

The arrangements for condensation of such gases heretofore available, have been so complicated and have interposed such difficulties into the handling and treatment of materials, as, for instance, in the filling and emptying of the kettle, that varnish manufacturers, for the most part, have preferred to dispense with such condensing apparatus, and to make use of vented kettles, and to bear the loss incident to the escape of the discharged gases which pass off up the chimney.

According to my invention, a condensing apparatus is carried directly by the cover of the portable kettle, so that when the kettle is removed from the fire the condensation apparatus is carried along with it on its cover, and the cover with the condensation apparatus can be lifted off the kettle or supported in any desired manner away from the kettle. The water jacketed condenser forming a portion of the condensation apparatus is also so arranged as to be readily detached and to be readily removable if desired.

By equipping the cover of the kettle in this manner, the use of condensation apparatus for condensing the gases is permitted without the necessity of making any considerable changes in the apparatus now commonly used, beyond the equipment of the kettle covers with the condensation apparatus, and the expense of such equipment is extremely little when the saving and improved results incident to the use of the condensation apparatus is considered. Other objects of my invention will appear in connection with its further description, and be pointed out in my claims, and with the foregoing and related objects in view, my invention consists in the parts, combinations and improvements herein set forth and claimed, and while I have shown and shall describe a specific embodiment of my invention, it is to be understood that same is for the purpose of illustration only, and that changes may be made therein, within the scope of my claims, without departing from my invention, or sacrificing any of its advantages.

Figure 1:
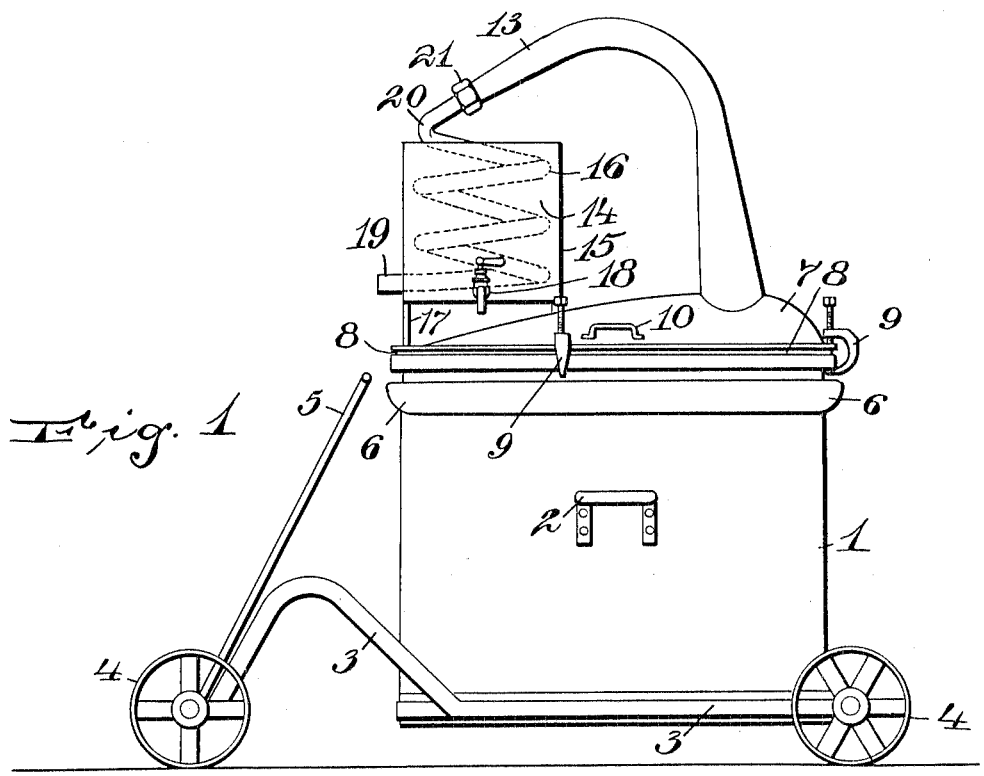

In the accompanying drawings forming a part of this specification, and wherein the same reference characters are uniformly used to designate the same parts throughout, Figure 1 is a side view, and Fig. 2 a top view of a varnish making apparatus involving my invention.

The kettle, which may be of any well known form used in the art, is designated by the reference character 1. Such kettle is preferably provided with handles 2 for moving it when desired, and is portable, being preferably mounted on a light truck which may comprise a framework 3, wheels 4 and tongue or handle 5, by means of which the kettle may be conveniently moved from place to place. The kettle is preferably provided with a flange or apron 6, extending therearound, for catching and retaining any material which may escape over its top.

The cover for the kettle is shown at 7. Such cover is preferably formed of an irregular dome shape, the highest point of the dome being preferably at one side of the center, for reasons hereinafter set forth. In order to make a tight joint between the kettle and cover and prevent the escape of gases, a bushing, which may have the form of a ring 8, and which may be of lead or other similar soft material suitable for the purpose, is interposed between the kettle and cover, and the cover is permanently clamped in place on the kettle by clamps provided for this purpose. Ordinary removable screw clamps, such as shown at 9, may be used for holding the cover in place on the kettle, though, of course, the use of other forms of clamps may be resorted to. The cover is preferably provided with means, such as the handles 10, whereby it may be lifted on or off or moved from place to place. The cover 7 is provided with an opening 11, preferably near one side thereof, and preferably at the highest part of the cover, the cover being formed with its irregular dome shape, above referred to, in order to permit the opening 11 to be formed on one side thereof, and also at its highest part. The condensation apparatus communicates with the interior of the kettle at the opening 11 of the cover, and preferably comprises an upstanding pipe or conduit 12, which preferably continues substantially straight upward for a considerable distance. Such pipe is preferably largest in the neighborhood where it emerges from the cover, so that it presents, in such neighborhood, a comparatively large cooling surface and thereby permits the condensation and return to the kettle, of a considerable portion of the gaseous elements which pass out through the opening 11, but which are condensed within the upstanding portion of the pipe 12, and fall back into the kettle. Such materials, which are of a comparatively high boiling point, upon falling back into the kettle, exert a solvent action upon the materials contained therein, and serve to secure better combination between the fused resins and the oil which is incorporated, and generally promote and accelerate, to a considerable degree, the various beneficial effects upon the materials secured by the heat treatment. The pipe 12 is preferably bent over at its upper part and constricted somewhat, as by being tapered down from its greatest diameter, forming a comparatively narrow neck 13.

The jacketed condenser 14, which may consist of a jacket 15 and a worm 16, is supported upon the cover 7, preferably upon legs as 17 provided for that purpose. The jacket 15 is provided with an outlet 18 for drawing off its contents. Arrangements may be made for running water through the jacket 16 if desired, but for the amount of material usually subjected to treatment in the kettle 1, it will ordinarily be sufficient to fill the jacket 16 with cold water at the beginning of operations, and one filling will suffice for condensing the discharged gases for one charge of the kettle. The outlet of the worm is shown at 19 and the inlet at 20, and a union or other connecting means 21 is provided for securing the inlet 20 of the worm to the neck 13 of the condensation pipe 12.

A capped opening 22 is preferably provided in the kettle cover at a convenient location with the open space at one side of the condensation apparatus which may be used, for example, in making additions of gums, solvents and the like during treatment and without removing the cover.

The operation of my improved device will be readily understood in connection with the foregoing description. The material to be treated, such as resins and the like, is placed in the kettle 1, which has been placed on the truck provided for that purpose, and the cover is securely clamped thereon in the manner which has been described, and the kettle is then moved over the fire, the jacket 15 having been filled with cold water, or, if preferred, connections for running water may be provided for the jacket. As the materials in the kettle are heated, certain of the contents thereof are volatilized, and the less volatile materials are condensed in the upstanding portion of the pipe 12 and fall back in the kettle, and there exert a solvent action on its contents and assist in and accelerate the various effects of the heat treatment, with the advantage, among other things, of securing an improved combination between the fused resins and the oil incorporated therewith. The more volatile materials which are not condensed in the pipe 12, pass over into the water jacketed condenser, and are condensed in the worm, and pass out in condensed form through the outlet 19 into any collecting means or receptacle which may be provided for that purpose and are saved.

With the arrangement described, the necessity of testing and judging the condition of the contents of the kettle, as by means of a rod inserted through the vent, is dispensed with, as the operator, after a little practice, can judge with considerable accuracy what is taking place in the kettle, by observing the character and quantity of the distillate collected, and, if preferred, the receptacle for receiving the distillate may be placed on a balance provided for that purpose, though this is not essential. When the kettle is removed from the fire, the condensation apparatus accompanies it and may be removed at any desired point away from the fire and the contents of the kettle removed, or subjected to any desired treatment or operation. The water jacketed condenser may be readily disconnected and removed when desired.

It will be apparent that an apparatus constructed in accordance with my invention has numerous advantages, among them being the readiness with which the existing apparatus for merely cooking or fusing, can be transformed into an effective apparatus for actually carrying out the process of distillation; the expense of making such changes is comparatively small, and the process being carried on in a closed receptacle, the product is greatly improved; the loss, by reason of the materials passing off as unreclaimed gases, is prevented; the condition of the material and the thoroughness of its treatment can be determined with accuracy and precision; and danger of fire from the ignition of escaping gases is eliminated, and the invention has numerous other advantages as will be apparent.

Having now described my invention, I claim:

1. In apparatus of the class described, a kettle, a removable domed cover therefor having its highest part at one side and provided with an opening thereat, a tapered conduit extending upwardly from said cover at said opening and terminating in a goose neck of restricted diameter, said conduit being exposed on its exterior to the air, and a water jacketed condenser comprising a worm on the said cover at the side opposite said conduit connection, and said worm being connected to the goose neck of said conduit, substantially as set forth.

2. A cover for varnish kettles, said cover being provided with an opening, a tapered conduit exposed on the outside to the air and secured to said cover with its larger end about said opening and extending substantially at right angles thereto for a distance exceeding one-half the diameter of the cover, and a removable water jacketed condenser on said cover at the side away from said opening, substantially as set forth.

3. An irregularly domed cover for varnish kettles, said cover having its highest part at one side of the center, an upwardly extending conduit exposed on its exterior to the air, a removable water jacketed condenser comprising a worm on said cover at the side opposite the conduit connection, and means of connection between said worm and conduit, substantially as set forth.

4. In apparatus of the class described, the combination of a wheeled truck, a varnish kettle on said truck, said varnish kettle being provided with a flange near its top for collecting any material which may escape, an irregularly domed cover for said varnish kettle having its highest point at one side and provided with an opening thereat, an upwardly extending conduit exposed on its exterior to the air and tapering to its largest dimension at the neighborhood of its point connection to the domed cover at the highest portion thereof about said opening, a water jacketed condenser upon said cover on the side opposite that where the conduit is connected and comprising a worm, a removable means of connection between said conduit and worm, and said cover being provided with a capped vent in the space left free and open by the condensation apparatus.

In testimony that I claim the foregoing, I have hereto set my hand, this 20th day of November, 1913.

LOUIS HAMBROCK, JR.

Witnesses:
M. A. JOHNSON,
H. TRAUTVETTER.